(12) United States Patent
Attar et al.

(10) Patent No.: US 8,689,025 B2
(45) Date of Patent: Apr. 1, 2014

(54) REDUCED TERMINAL POWER CONSUMPTION VIA USE OF ACTIVE HOLD STATE

(75) Inventors: Rashid Ahmed Akbar Attar, San Diego, CA (US); Naga Bhushan, San Diego, CA (US); Jean Put Ling Au, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1777 days.

(21) Appl. No.: 11/676,902

(22) Filed: Feb. 20, 2007

(65) Prior Publication Data
US 2007/0195723 A1 Aug. 23, 2007

Related U.S. Application Data

(60) Provisional application No. 60/775,443, filed on Feb. 21, 2006, provisional application No. 60/775,693, filed on Feb. 21, 2006.

(51) Int. Cl.
*G06F 1/32* (2006.01)

(52) U.S. Cl.
USPC ............ 713/320; 370/311; 370/468; 455/574

(58) Field of Classification Search
USPC ......... 370/468, 311; 455/574, 343.2; 713/320
See application file for complete search history.

(56) References Cited

U.S. PATENT DOCUMENTS

| | | | |
|---|---|---|---|
| 6,078,572 A | 6/2000 | Tanno et al. | |
| 6,130,886 A | 10/2000 | Ketseoglou et al. | |
| 6,694,469 B1 | 2/2004 | Jalali et al. | |
| 6,717,924 B2 * | 4/2004 | Ho et al. | 370/311 |
| 6,788,687 B2 | 9/2004 | Bao et al. | |
| 6,822,952 B2 | 11/2004 | Abrol et al. | |

(Continued)

FOREIGN PATENT DOCUMENTS

| | | |
|---|---|---|
| EP | 0959634 A2 | 11/1999 |
| EP | 0995275 A1 | 4/2000 |

(Continued)

OTHER PUBLICATIONS

International Search Report—Patent Cooperation Treaty, PCT/US2007/062524. International Searching Authority—European Patent Office, Jul. 27, 2007.

(Continued)

*Primary Examiner* — Albert Wang
(74) *Attorney, Agent, or Firm* — Kevin T. Cheatham

(57) ABSTRACT

An access terminal (AT) in a cellular communication system is configured to operate in an active hold (AH) state, a transitional state between traffic and dormant states. The AT applies power to its transmit chain with a low duty cycle while in the AH state, conserving battery power. To improve robustness of the communications, the radio network may power control the AT to a higher level relative to the power control level of the AT in the traffic state. Transition from the traffic state to the AH state may be initiated after a brief period of inactivity on the reverse link. The AT may remain in the AH state while receiving forward link payload data. Transmission of a reverse link payload packet in the AH state may initiate transition to the traffic state. A prolonged period of inactivity may initiate a transition from the AH state to the dormant state.

50 Claims, 4 Drawing Sheets

(56) References Cited

U.S. PATENT DOCUMENTS

| | | |
|---|---|---|
| 6,882,632 B1 | 4/2005 | Koo et al. |
| 6,912,214 B2 | 6/2005 | Madour et al. |
| 6,963,534 B1 | 11/2005 | Shorey et al. |
| 6,970,437 B2 | 11/2005 | Lott et al. |
| 6,980,569 B1 | 12/2005 | Beyda et al. |
| 6,987,780 B2 | 1/2006 | Wei et al. |
| 7,002,900 B2 | 2/2006 | Walton et al. |
| 7,042,869 B1 | 5/2006 | Bender |
| 7,043,249 B2 | 5/2006 | Sayeedi |
| 7,050,405 B2 | 5/2006 | Attar et al. |
| 7,062,283 B2 | 6/2006 | Dooley |
| 7,065,060 B2 | 6/2006 | Yun et al. |
| 7,088,701 B1 | 8/2006 | Attar et al. |
| 7,099,629 B1 | 8/2006 | Bender |
| 7,127,654 B2 | 10/2006 | Jalali et al. |
| 7,139,274 B2 | 11/2006 | Attar et al. |
| 7,145,940 B2 | 12/2006 | Gore et al. |
| 7,170,876 B2 | 1/2007 | Wei et al. |
| 7,463,867 B2 | 12/2008 | Luo et al. |
| 7,680,211 B1 | 3/2010 | von der Embse |
| 7,719,991 B2 | 5/2010 | Bhushan et al. |
| 7,764,981 B2* | 7/2010 | Kalofonos et al. ............ 455/574 |
| 8,077,595 B2 | 12/2011 | Bhushan et al. |
| 2001/0009555 A1 | 7/2001 | Diepstraten et al. |
| 2002/0002704 A1 | 1/2002 | Davis et al. |
| 2002/0145990 A1 | 10/2002 | Sayeedi |
| 2002/0193112 A1 | 12/2002 | Aoki et al. |
| 2003/0040315 A1* | 2/2003 | Khaleghi et al. ............ 455/435 |
| 2003/0072254 A1 | 4/2003 | Ma et al. |
| 2003/0153327 A1 | 8/2003 | Tajiri et al. |
| 2003/0220103 A1 | 11/2003 | Kim et al. |
| 2003/0235147 A1 | 12/2003 | Walton et al. |
| 2004/0022203 A1 | 2/2004 | Michelson et al. |
| 2004/0063431 A1 | 4/2004 | Julka et al. |
| 2004/0095851 A1 | 5/2004 | Ellner et al. |
| 2004/0141481 A1 | 7/2004 | Lee et al. |
| 2004/0147223 A1 | 7/2004 | Cho |
| 2004/0228267 A1 | 11/2004 | Agrawal et al. |
| 2005/0063298 A1 | 3/2005 | Ling et al. |
| 2005/0073969 A1 | 4/2005 | Hart et al. |
| 2005/0111397 A1 | 5/2005 | Attar et al. |
| 2005/0111437 A1 | 5/2005 | Maturi |
| 2005/0111599 A1 | 5/2005 | Walton et al. |
| 2005/0135284 A1 | 6/2005 | Nanda et al. |
| 2005/0135291 A1 | 6/2005 | Ketchum et al. |
| 2005/0135318 A1 | 6/2005 | Walton et al. |
| 2005/0135403 A1 | 6/2005 | Ketchum et al. |
| 2005/0135416 A1 | 6/2005 | Ketchum et al. |
| 2005/0141475 A1 | 6/2005 | Vijayan et al. |
| 2005/0163262 A1 | 7/2005 | Gupta |
| 2005/0195763 A1 | 9/2005 | Kadous et al. |
| 2005/0249177 A1 | 11/2005 | Huo et al. |
| 2005/0270969 A1 | 12/2005 | Han et al. |
| 2005/0281290 A1 | 12/2005 | Khandekar et al. |
| 2006/0013182 A1 | 1/2006 | Balasubramanian et al. |
| 2006/0018397 A1 | 1/2006 | Sampath et al. |
| 2006/0018411 A1 | 1/2006 | Gore et al. |
| 2006/0023772 A1 | 2/2006 | Mudulodu et al. |
| 2006/0088003 A1* | 4/2006 | Harris ............................ 370/329 |
| 2006/0133273 A1 | 6/2006 | Julian et al. |
| 2006/0133521 A1 | 6/2006 | Sampath et al. |
| 2006/0135080 A1 | 6/2006 | Khandekar et al. |
| 2006/0136790 A1 | 6/2006 | Julian et al. |
| 2006/0171295 A1 | 8/2006 | Ihm et al. |
| 2006/0178153 A1 | 8/2006 | Tenny et al. |
| 2006/0193338 A1 | 8/2006 | Zheng et al. |
| 2006/0198344 A1 | 9/2006 | Teague et al. |
| 2006/0203794 A1 | 9/2006 | Sampath et al. |
| 2006/0203845 A1 | 9/2006 | Monogioudis |
| 2006/0205413 A1 | 9/2006 | Teague |
| 2006/0209732 A1 | 9/2006 | Gorokhov et al. |
| 2006/0209927 A1 | 9/2006 | Khandekar et al. |
| 2006/0217124 A1 | 9/2006 | Bi et al. |
| 2006/0227887 A1 | 10/2006 | Li et al. |
| 2006/0233124 A1 | 10/2006 | Palanki |
| 2006/0233131 A1 | 10/2006 | Gore et al. |
| 2006/0240784 A1 | 10/2006 | Naguib et al. |
| 2006/0274712 A1 | 12/2006 | Malladi et al. |
| 2006/0276212 A1 | 12/2006 | Sampath et al. |
| 2006/0286974 A1 | 12/2006 | Gore et al. |
| 2007/0010957 A1 | 1/2007 | Sampath et al. |
| 2007/0011589 A1 | 1/2007 | Palanki |
| 2007/0019535 A1 | 1/2007 | Sambhwani et al. |
| 2007/0025325 A1 | 2/2007 | Kumar |
| 2007/0025345 A1 | 2/2007 | Bachl et al. |
| 2007/0030839 A1* | 2/2007 | Vimpari et al. ............... 370/342 |
| 2007/0070942 A1* | 3/2007 | Harris et al. .................. 370/329 |
| 2007/0071127 A1 | 3/2007 | Gore et al. |
| 2007/0087749 A1 | 4/2007 | Ionescu et al. |
| 2007/0195688 A1 | 8/2007 | Bhushan et al. |
| 2007/0195740 A1 | 8/2007 | Bhushan et al. |
| 2007/0195747 A1 | 8/2007 | Attar et al. |
| 2007/0195899 A1 | 8/2007 | Bhushan et al. |
| 2007/0195908 A1 | 8/2007 | Attar et al. |
| 2007/0293172 A1 | 12/2007 | Shi et al. |
| 2008/0151743 A1 | 6/2008 | Tong et al. |
| 2009/0067405 A1* | 3/2009 | Zhang et al. .................. 370/345 |
| 2009/0310702 A1 | 12/2009 | Lewis |
| 2012/0014392 A1 | 1/2012 | Bhushan et al. |
| 2012/0269052 A1 | 10/2012 | Chen et al. |

FOREIGN PATENT DOCUMENTS

| | | |
|---|---|---|
| EP | 1367760 A2 | 12/2003 |
| EP | 1422851 A1 | 5/2004 |
| EP | 1489775 A1 | 12/2004 |
| EP | 1513304 A2 | 3/2005 |
| EP | 1542488 A1 | 6/2005 |
| EP | 1608120 A2 | 6/2005 |
| EP | 1565015 A2 | 8/2005 |
| EP | 1596525 A1 | 11/2005 |
| EP | 1619847 A2 | 1/2006 |
| GB | 2394871 A | 5/2004 |
| JP | H10303848 A | 11/1998 |
| JP | 2000504908 T | 4/2000 |
| JP | 2000270024 | 9/2000 |
| JP | 2002320260 A | 10/2002 |
| JP | 2002374562 A | 12/2002 |
| JP | 2002544733 | 12/2002 |
| JP | 2003152679 A | 5/2003 |
| JP | 2003533078 | 11/2003 |
| JP | 2004158901 A | 6/2004 |
| JP | 2005510904 A | 4/2005 |
| JP | 2005536967 T | 12/2005 |
| JP | 2006270968 A | 10/2006 |
| KR | 20040029416 | 4/2004 |
| KR | 2005120806 | 12/2005 |
| RU | 2238611 C1 | 10/2004 |
| RU | 2004117217 A | 3/2005 |
| WO | WO0069203 | 11/2000 |
| WO | WO0176110 A2 | 10/2001 |
| WO | WO0180477 | 10/2001 |
| WO | WO0219605 | 3/2002 |
| WO | WO03017688 A2 | 2/2003 |
| WO | WO03034644 A1 | 4/2003 |
| WO | WO03041298 | 5/2003 |
| WO | WO03096581 A1 | 11/2003 |
| WO | WO03096598 | 11/2003 |
| WO | WO2004004269 | 1/2004 |
| WO | WO2004038984 A2 | 5/2004 |
| WO | WO2004038988 | 5/2004 |
| WO | 2004/056142 A1 | 7/2004 |
| WO | WO2004057894 A1 | 7/2004 |
| WO | WO2004084450 | 9/2004 |
| WO | WO2004095851 | 11/2004 |
| WO | WO2004098098 | 11/2004 |
| WO | WO2004114548 A1 | 12/2004 |
| WO | WO2004114549 | 12/2004 |
| WO | WO2005015775 A1 | 2/2005 |
| WO | WO2005032001 A1 | 4/2005 |
| WO | WO2005048640 | 5/2005 |
| WO | WO2005067247 A1 | 7/2005 |

(56) References Cited

FOREIGN PATENT DOCUMENTS

| WO | WO2005071867 | | 8/2005 |
|---|---|---|---|
| WO | WO2005088882 | | 9/2005 |
| WO | WO2005125139 | A1 | 12/2005 |

OTHER PUBLICATIONS

Fan, et al.; "On the Reverse Link Performance of Cdma2000 1Xev-Do Revision A System", IEEE Xplore Online, Feb. 2005, pp. 2244-2250,XP002438335,New York, USA.

Hermann Rohling et al., : "Performance Comparison of Different Multiple Access Schemes for the Downlink of an OFDM Communication System", Vehicular Technology Conference, 1997, 47th IEEE, vol. 3, May 3-7, 1997, pp. 1365-1369.

Ojanpera, T. et al.: "Frames—Hybrid Multiple Access Technology," IEEE International Symposium on Spread Spectrum Techniques and Applications, No. 1, Sep. 22, 1996, pp. 320-324.

Taiwan Search Report—TW096106485—TIPO—Mar. 8, 2011.

Taiwan Search Report—TW096106486—TIPO—Jan. 10, 2011.

Taiwan Search Report—TW096106487—TIPO—Dec. 15, 2010.

Taiwanese Search report—096106482—TIPO—Jan. 24, 2011.

Written Opinion—PCT/US2007/062524, International Search Authority, European Patent Office, Jul. 27, 2007.

\* cited by examiner

REDUCED TERMINAL POWER CONSUMPTION VIA USE OF ACTIVE HOLD STATE

CLAIM OF PRIORITY UNDER 35 U.S.C. §119

The present application for patent claims priority to U.S. Provisional Patent Application Ser. No. 60/775,443, entitled "Wireless Communication System and Method," filed on Feb. 21, 2006; the present application for patent also claims priority to U.S. Provisional Patent Application Ser. No. 60/775,693, entitled "DO Communication System and Method," filed on Feb. 21, 2006. Each of these Provisional Patent Applications is assigned to the assignee of the present Application and is expressly incorporated by reference as if fully set forth herein, including all figures, tables, and claims.

BACKGROUND

1. Field

The present invention relates generally to telecommunications, and, more specifically, the invention relates to wireless communication systems and cellular communication systems.

2. Background

A modern communication system is expected to provide reliable data transmission for a variety of applications, such as voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents known as the "W-CDMA standard," (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard, and (6) certain other standards. The standards expressly listed above are incorporated by reference as if fully set forth herein, including annexes, appendices, and other attachments.

Data-only and data-optimized or "DO" cellular communication systems have been developed to satisfy the constantly increasing demand for wireless data services. As the name implies, DO systems are optimized for data transmission (as opposed to voice transmission), and in particular such systems are optimized for downlink data transmission. Data-optimized systems need not exclude uplink data transmission, or voice transmission in either direction. It should be noted that voice may be transmitted as data, for example, in the case of voice over internet protocol (VoIP) transmissions.

In wireless networks, an access terminal configured for communication may be in a traffic state/mode or in a dormant state/mode. In the traffic state, air link resources for communication between the access terminal and the radio network are allocated at the radio network and powered on at the access terminal. Air link resources at the access terminal may include, for example, finger resources and channel elements. In the dormant state, the traffic channel is torn down, and air link resources are powered off at the access terminal. Power required for operating these resources is consequently not spent during the dormant state, and battery life at the access terminal is extended. Other subsystems of the access terminal may also be powered off or put into a power saving mode for most of the time during the dormant state; the access terminal then wakes up every so often to listen to the paging channel of the wireless system, in order to respond to the incoming pages or communication requests. The duty cycle of such periodic paging channel checks is low, to reduce the stand-by power consumption.

For a given battery capacity, power consumption determines the amount of time that the access terminal can operate without recharging. Conversely, for a specified operating time between recharging the battery, average power consumption determines the required battery capacity and, consequently, the size, weight, and cost of the battery. Reducing power consumption of an access terminal is thus quite important.

Because transmissions from a given access terminal are interference for transmissions from other access terminals, it is also desirable to reduce the duration and/or power levels of such transmissions.

Therefore, there is a need in the art for methods and apparatus that would reduce power consumption and interference of access terminals. There is also a need in the art for methods and apparatus for reducing power consumption and interference of the access terminals without excessively compromising performance characteristics of the access terminals and of the radio networks with which the terminals communicate. There is a further need for methods of upgrading previously-deployed networks to provide for reduced access terminal power consumption and interference, while at the same time maintaining backward compatibility with legacy access terminals, and minimizing or eliminating hardware changes to the radio network.

SUMMARY

Embodiments disclosed herein address the above stated needs by providing methods, apparatus, and machine-readable articles of manufacture for implementing an active hold state in a wireless access terminal, and for communicating with the wireless access terminal.

In an embodiment, a wireless access terminal for communicating with a base transceiver station of a radio network includes a receiver configured to receive forward link transmissions from the base transceiver station, a transmitter configured to send reverse link transmissions to the base transceiver station, a memory storing program code, and a controller coupled to the receiver, transmitter, and the memory. The controller is configured to execute the program code to cause the wireless access terminal to: (1) initiate a transition from a traffic state to an active hold state in response to absence of reverse link traffic during a first predetermined time period, (2) initiate a transition from the active hold state to the traffic state in response to presence of reverse link traffic, (3) initiate a transition from the active hold state to a dormant state in response to absence of forward link traffic and reverse link traffic during at least a second predetermined period, (4) initiate a transition from the dormant state to the traffic state in response to presence of reverse link traffic, (5) remain in the active hold state after transitioning into the active hold state during simultaneous presence of forward link traffic and absence of reverse link traffic (i.e., the forward link traffic is present at the same time as reverse link traffic is absent), and (6) power off at least one component of the transmitter in the active hold state so that duty cycle of said at least one component is less than a predetermined threshold in the active hold state. In aspects, the threshold may be twenty-five percent of the duty cycle.

In an embodiment, a machine-readable medium comprises instructions embedded therein. When the instructions are executed by at least one processor of a wireless access terminal for communicating with a base transceiver station of a radio network, the instructions cause the wireless access terminal to (1) initiate a transition from a traffic state to an active hold state in response to absence of reverse link traffic during a first predetermined time period, (2) initiate a transition from the active hold state to the traffic state in response to presence of reverse link traffic, (3) initiate a transition from the active hold state to the dormant state in response to absence of forward link traffic and reverse link traffic during at least a second predetermined period, (4) initiate a transition from the dormant state to the traffic state in response to presence of reverse link traffic, (5) after transitioning into the active hold state, remain in the active hold state during simultaneous presence of forward link traffic and absence of reverse link traffic, and (6) in the active hold state, power off at least one component of the transmitter so that duty cycle of said at least one component is less than twenty-five percent in the active hold state.

In an embodiment, a wireless access terminal for communicating with a base transceiver station of a radio network includes a means for receiving forward link transmissions from the base transceiver station (e.g., a receiver/receiver chain), a means for sending reverse link transmissions to the base transceiver station (e.g., a transmitter/transmitter chain), a means for storing program code (e.g., a memory device), and a controller means (e.g., a processor) for executing the program code to cause the wireless access terminal to perform a number of steps. The steps include (1) initiating a transition from a traffic state to an active hold state in response to absence of reverse link traffic during a first predetermined time period, (2) initiating a transition from the active hold state to the traffic state in response to presence of reverse link traffic, (3) initiating a transition from the active hold state to a dormant state in response to absence of forward link traffic and reverse link traffic during at least a second predetermined period, (4) initiating a transition from the dormant state to the traffic state in response to presence of reverse link traffic, (5) after transitioning into the active hold state, remaining in the active hold state during simultaneous presence of forward link traffic and absence of reverse link traffic, and (6) powering off at least one component of the transmitter so that duty cycle of said at least one component is less than twenty-five percent in the active hold state.

In an embodiment, a method is provided for operating a wireless access terminal communicating with a base transceiver station of a radio network. The method includes these steps: (1) initiating a transition from a traffic state to an active hold state in response to absence of reverse link traffic between the wireless access terminal and the base transceiver station during a first predetermined time period, (2) initiating a transition from the active hold state to the traffic state in response to presence of reverse link traffic between the wireless access terminal and the base transceiver station, (3) initiating a transition from the active hold state to the dormant state in response to absence of forward link traffic and reverse link traffic between the wireless access terminal and the base transceiver station during at least a second predetermined period, (4) initiating a transition from the dormant state to the traffic state in response to presence of reverse link traffic between the wireless access terminal and the base transceiver station, (5) after transitioning into the active hold state, causing the wireless access terminal to remain in the active hold state during simultaneous presence of forward link traffic and absence of reverse link traffic between the wireless access terminal and the base transceiver station, and (6) in the active hold state, powering off at least one component of a transmit chain of the wireless access terminal so that duty cycle of said at least one component is less than twenty-five percent in the active hold state.

In an embodiment, a method is provided for operating a wireless access terminal for communicating with a base transceiver station of a radio network through a forward link and a reverse link. The method includes the following steps: (1) step for causing the wireless access terminal to enter a dormant state in response to a period of traffic inactivity on the forward and reverse links between the wireless access terminal and the base transceiver station, (2) step for causing the wireless access device to enter a traffic state in response to traffic activity on the reverse link, and (3) step for causing the wireless access terminal to enter an active hold state in response to a period of traffic inactivity on the reverse links. In the method, the step for causing the wireless access terminal to enter the active hold state is performed regardless of traffic activity on the forward link, and the wireless access terminal in the active hold state powers on and off at least a portion of a transmit chain of the wireless access terminal with a duty cycle smaller than twenty-five percent.

In an embodiment, a base transceiver station in a radio network is provided. The base transceiver station includes a receiver configured to receive data from a wireless access terminal on a reverse link, a transmitter configured to transmit data to the wireless access terminal on a forward link, and a processor coupled to the receiver and to the transmitter. The processor is configured to cause the base transceiver station to perform steps comprising: (1) granting a request from the wireless access terminal to enter an active hold state, wherein the wireless access terminal generates the request in response to a period of traffic inactivity on the reverse link, and wherein the wireless access terminal decreases feedback update frequency for the forward link in the active hold state relative to a traffic state, (2) transmitting forward link traffic while the wireless access terminal is in the active hold state, and (3) receiving reverse link traffic in the traffic state.

In an embodiment, a base transceiver station in a radio network includes the following components: a means for receiving data from a wireless access terminal on a reverse link, a means for transmitting data to the wireless access terminal on a forward link, and a control means for processing. The control means is coupled to the receiver and to the transmitter, and is configured to cause the base transceiver station to perform these steps: (1) granting a request from the wireless access terminal to enter an active hold state, wherein the wireless access terminal generates the request in response to a period of traffic inactivity on the reverse link, and wherein the wireless access terminal decreases feedback update frequency for the forward link while in the active hold state relative to a traffic state, and (2) transmitting forward link traffic while the wireless access terminal is in the active hold state.

In an embodiment, a method is provided for operating a base transceiver station in a radio network to control a wireless access terminal. The method includes (1) granting a request from the wireless access terminal to enter an active hold state, wherein the wireless access terminal generates the request in response to a period of traffic inactivity on a reverse link between the wireless access terminal and the base transceiver station, wherein the wireless access terminal in the active hold state provides feedback for a forward link between the wireless access terminal and the base transceiver station with a first frequency, an wherein the wireless access terminal provides feedback for the forward link in a traffic state with a second frequency, the second frequency being greater than the first frequency, and (2) transmitting traffic on the forward link while the wireless access terminal is in the active hold state.

In an embodiment, a machine-readable medium includes instructions embedded therein. When the instructions are executed by at least one processor of a base transceiver station of a radio network, the instructions cause the base transceiver station to perform the following operations: (1) granting a request from a wireless access terminal to enter an active hold state, wherein the wireless access terminal generates the request in response to a period of traffic inactivity on a reverse link between the wireless access terminal and the base transceiver station, wherein the wireless access terminal in the active hold state provides feedback for a forward link between the wireless access terminal and the base transceiver station with a first frequency, an wherein the wireless access terminal provides feedback for the forward link in a traffic state with a second frequency, the second frequency being greater than the first frequency, and (2) transmitting traffic on the forward link while the wireless access terminal is in the active hold state.

These and other embodiments and aspects of the present invention will be better understood with reference to the following description, drawings, and appended claims.

DETAILED DESCRIPTION

Figure 1:
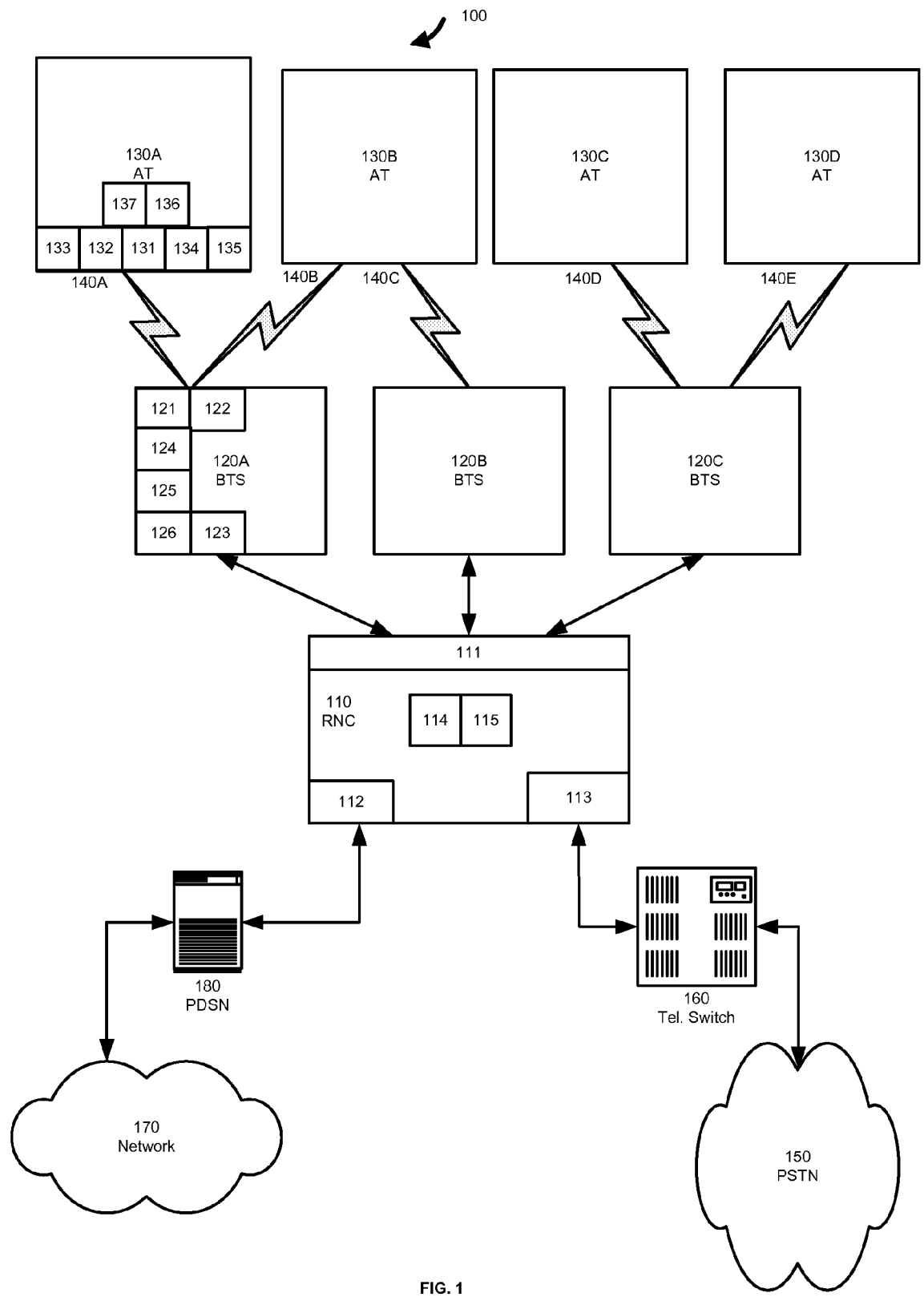
FIG. 1 illustrates selected components of a cellular communication system configured in accordance with an embodiment of the present invention.

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make or use the invention, and not to limit the scope of legal protection afforded the invention, which is defined by the claims and their equivalents.

The word "traffic" generally refers to payload or user traffic, such as data other than air interface control and pilots.

An access terminal, also referred to as AT, subscriber station, user equipment, UE, mobile terminal, or MT, may be mobile or stationary, and may communicate with one or more base transceiver stations. An access terminal may be any of a number of types of devices, including but not limited to PC card, external or internal modem, wireless telephone, and personal digital assistant (PDA) with wireless communication capability. An access terminal transmits and receives data packets to or from a radio network controller through one or more base transceiver stations.

Base transceiver stations and base station controllers are parts of a network called radio network, RN, access network, and AN. Radio network may be a UTRAN or UMTS Terrestrial Radio Access Network. The radio network may transport data packets between multiple access terminals. The radio network may be further connected to additional networks outside the radio network, such as a corporate intranet, the Internet, a conventional public switched telephone network (PSTN), or another radio network, and may transport data and voice packets between each access terminal and such outside networks. Depending on conventions and on the specific implementation variants, a base transceiver station may be referred to by other names, such as Node-B, base station system (BSS), or simply base station. Similarly, a base station controller may be referred to by other names, such as radio network controller, RNC, controller, mobile switching center, or serving GPRS support node.

The scope of the invention extends to these and similar wireless communication system components.

FIG. 1 illustrates selected components of a communication network 100, which includes a radio network controller 110 coupled to wireless base transceiver stations 120A, 120B, and 120C. The base transceiver stations 120 communicate with access terminals 130A, 130B, 130C, and 130D through corresponding wireless connections 140A through 140E. Each of the wireless connections 140 represents both a forward link (from the BTS to the AT, also known as downlink) and a reverse link (from the AT to the BTS, also known as uplink). The radio network controller 110 is coupled to a public switched telephone network 150 through a telephone switch 160, and to a packet switched network 170 through a packet data server node (PDSN) 180. Data interchange between various network elements, such as the radio network controller 110 and the packet data server node 180, can be implemented using any number of protocols, for example, the Internet Protocol (IP), an asynchronous transfer mode (ATM) protocol, T1, E1, frame relay, and other protocols.

The radio network controller 110 and the base transceiver stations 120 may be part of a data-optimized radio network, such as a 1xEV-DO network. In the illustrated embodiment, the radio network provides both data communication services and cellular telephone services to the access terminals 130. In alternative embodiments, the radio network may provide only data services (including VoIP and similar packetized data-based voice communications), or only voice services.

Multiple or even all the access terminals 130 may be in the same cell or site, or each access terminal 130 may be in a separate cell or site.

A typical access terminal, for example, the access terminal 130A, includes receiver circuitry 131, transmitter circuitry 132, encoder 133, decoder 134, equalizer 135, processor 136, and memory device 137. The receiver, transmitter, encoder, decoder, and equalizer are configured by the processor executing program code stored in the memory device. Each access terminal 130 is configured to communicate data using at least one transmission protocol, such as the wireless packet transmission protocols described in the specifications mentioned above. The access terminals 130 communicate with the base transceiver stations 120 via communication channels 140A through 140E, as shown in FIG. 1.

Each of the base transceiver stations 120 includes one or more wireless receivers (e.g., receiver 121 of the BTS 120A), one or more wireless transmitters (e.g., transmitter 122 of the BTS 120A), radio network controller interface (e.g., interface 123), a memory (e.g. memory 124), a processor (e.g. processor 125), and encoder/decoder circuitry (e.g., encoder/decoder circuitry 126). A receiver/transmitter pair and other components of each base transceiver station are configured by the station's processor operating under control of the program code stored in the BTS's memory, to establish forward and reverse links with the access terminals 130 in order to send packets to and receive packets from the access terminals 130. In the case of data services, for example, the base transceiver stations 120 may receive forward link data packets from the packet switched network 170 through the packet data server node 180 and through the radio network controller 110, and transmit these packets to the access terminals 130. The base transceiver stations 120 may receive reverse link data packets that originate at the access terminals 130, and forward these packets to the packet switched network 170 through the radio network controller 110 and the packet data server node 180. In the case of telephone (voice) services, the base transceiver stations 120 may receive forward link data packets from the telephone network 150 through the telephone switch 160 and through the radio network controller 110, and transmit these packets to the access terminals 130. Voice packets originating at the access terminals 130 may be received at the base transceiver stations 120 and forwarded to the telephone network 150 via the radio network controller 110 and the telephone switch 160.

In some alternative embodiments, the transmitter, receiver, and other components of each BTS may each have separate processors.

The radio network controller 110 includes one or more interfaces 111 to the base transceiver stations 120, an interface 112 to the packet data server node 180, and an interface 113 to the telephone switch 160. The interfaces 111, 112, and 113 operate under control of one or more processors 114 executing program code stored in one or more memory devices 115.

The network 100 illustrated in FIG. 1 includes one public switched telephone network, one packet switched network, one base station controller, three base transceiver stations, and four access terminals. A person skilled in the art would recognize, after perusal of this document, that alternative embodiments in accordance with aspects of the invention need not be limited to any particular number of these components. For example, a lesser or a greater number of base transceiver stations and access terminals may be included in some embodiments. Furthermore, the communication network 100 may connect the access terminals 130 to one or more additional communication networks, for example, a second wireless communication network having a number of wireless access terminals.

As has already been mentioned, a known access terminal configured for communication may be in a dormant or traffic state, depending on the status of the network traffic between such known access terminal and the radio network. The traffic state corresponds to traffic activity between the radio network and the mobile terminal. For example, an access terminal may transition from dormant to traffic state in response to a voice call or data communication. The voice call or the data communication may be incoming (to the access terminal) or outgoing (from the access terminal). Conversely, the access terminal may transition from the traffic state to the dormant state when traffic activity ceases for some predetermined period of time. Typically, the radio network controls the transitions between the two states.

Traffic activity may be quite asymmetrical between the radio network and the access terminal. In other words, considerably more traffic may be communicated in one direction than in the opposite direction. This is particularly so for data communication, when downlink traffic flow typically exceeds uplink traffic flow by a large margin. For example, a user at an access terminal may be downloading a large file for a relatively long period of time, with mostly control information being communicated uplink. The control information may be from various layers, for example, Internet Protocol (IP) acknowledgements, and power control, rate control, and pilot of the physical air link. Similarly, a VoIP conversation may be one-sided, with the user at the access terminal mostly listening or holding the line for long stretches of the time. During such time periods, uplink resources of the access terminal continue to be powered on and consequently consuming power, although they are not needed to carry user (payload) data from the access terminal to the radio network.

In an embodiment, an access terminal 130 (e.g. the access terminal 130A) communicates with a base transceiver station (e.g., BTS 120A) of a radio network. The radio network may be, for example, a data-optimized radio network such as 1xEV-DO network, a data-only network, or a voice-only network. The access terminal is configured to be in one of three states while connected to the radio network: (1) traffic state, (2) dormant state, and (3) active hold (AH) state. The first two states are similar or identical to the conventional traffic and dormant states of an access terminal, respectively. The active hold state is a transitional intermediate state between the dormant and traffic states. This state allows additional reduction in the power consumption of the access terminal, particularly during prolonged periods of reverse link traffic inactivity that coincide with forward link traffic activity of the access terminal.

In the active hold state, certain air link resources are used with a low duty cycle by the access terminal. For example, channel elements, finger resources, and other transmit chain components may be powered down (off) on the reverse link side of the access terminal for a substantial percentage of the time. For example, the duty cycle of the transmit chain may be less than fifty percent, less than twenty-five percent, or less than five percent. In some variants, the access network (e.g., BTS) does not deallocate, deassign, or power off channel elements and finger resources from serving the access terminal in the active hold state. Moreover, in some variants the radio network does not deallocate any resources from the access terminal in this state.

Figure 2:
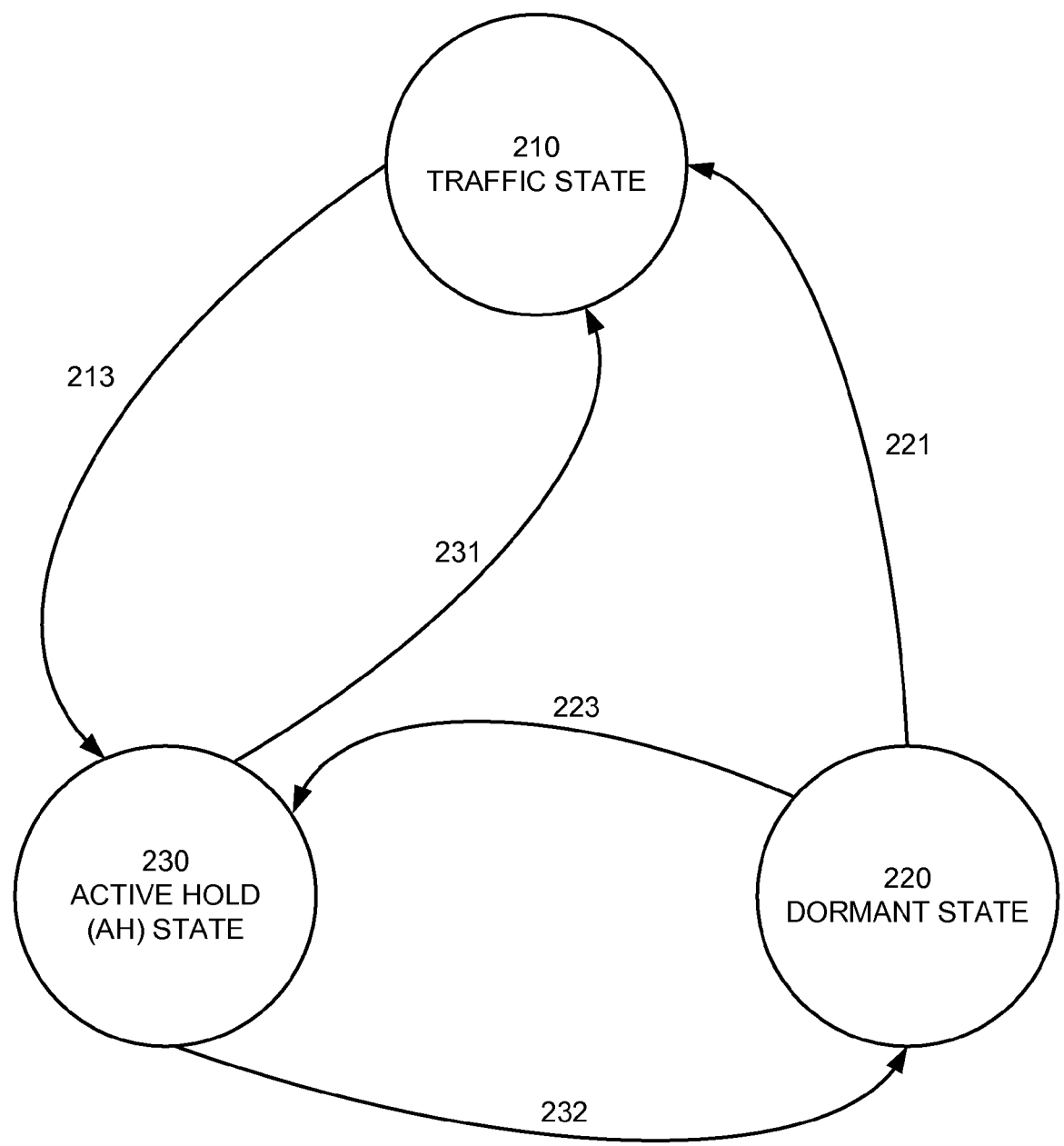
FIG. 2 is a state diagram showing selected states and transitions of an access terminal operating in the network of FIG. 1 and configured in accordance with an embodiment of the present invention.

FIG. 2 is a state diagram showing transitions between the traffic state 210, dormant state 220, and active hold state 230. In the traffic state 210, the access terminal 130 is actively communicating with the base transceiver station 120. A transition 213 from the traffic state 210 to the active hold state 230 takes place in response to a brief period of traffic inactivity. (It should be noted that the references to activity and inactivity that cause or initiate the transitions between the traffic, dormant, and active hold states are references to payload traffic activity or inactivity, respectively.) The transition 213 may take place after a period of reverse link inactivity, and/or after a period of both reverse and forward link inactivity. In some embodiments, the transition 213 is initiated after expiration of a reverse link AH (active hold) inactivity timer, or after expiration of a reverse link AH inactivity timer and a forward link AH inactivity timer. (The two timers may be set to expire after the same or different time periods.)

A transition 231 from the active hold state 230 to the traffic state 210 is initiated when traffic activity between the access terminal and the radio network renews. For example, reverse link traffic will initiate the transition 231. In variants where the access terminal enters the active hold state 230 due to brief inactivity on both reverse and forward links (rather than on the reverse link alone), renewed forward link activity may also initiate the transition 231.

A transition 232 from the active hold state 230 to the dormant state 220 is initiated in response to another period of traffic inactivity while in the active hold state 230. The transition 232 may take place after a period of inactivity on both the reverse and the forward links. In some embodiments, the transition 232 is initiated after expiration of a reverse link dormant inactivity timer and after expiration of a forward link dormant inactivity timer. As in the case of the transition 213, the two timers may be set to expire after the same or different time periods. The transition 232 is therefore initiated after some period of inactivity on both the reverse and the forward links.

A transition 221 from the dormant state 220 to the traffic state 210 is initiated in response to presence of reverse link traffic. In some embodiments, the transition 221 may be initiated in response to any traffic (payload) between the access terminal and the base transceiver station. In some embodiments, however, a transition 223 from the dormant state 220 to the active hold state 230 is initiated in response to solely forward link traffic, while the transition 221 is initiated whenever reverse link traffic appears.

The transitions between the different states shown in FIG. 2 may be initiated by the access terminal, for example, by sending an otherwise unused (spare) codeword on the reverse rate indicator (RRI) channel. The use of a spare RRI codeword is advantageous because it is unlikely to be mistaken for anything else at the radio network. The radio network (the radio network controller 110, for example) then decides whether to grant the transition requested. The grant may be sent to the access terminal on one of the forward link control channels, for example on the acknowledge (ACK) channel. In effect, the ACK in response to the RRI indicates that the radio network also transitioned the access terminal to the active hold state. Alternatively or additionally, the radio network may initiate some of the transitions, by sending an appropriate control message to the access terminal. In specific variants, the transitions are initiated as follows:

The transition 213 from the traffic state 210 to the active hold state 230—Initiated by the access terminal through the RRI channel using a special RRI codeword, and granted by the access network through the ACK channel;

The transition 232 from the active hold state 230 to the dormant state 220—Initiated by either the access terminal or the radio network after prolonged inactivity (at least 2 seconds) of both reverse and forward link traffic;

The transition 231 from the active hold state 230 to the traffic state 210—Initiated by the access terminal due to a reverse link packet and granted by the radio network. The special RRI codeword may be used to transition to the active hold state (access terminal may use this to indicate to the radio network that it is attempting to enter the active hold state), and the ACK channel in response to the special RRI codeword may be the radio network indicating to the access terminal that the access terminal is now in the active hold state.

It should be noted that the ACK channel messages may remain the same as in existing systems, but the interpretation of these messages may change when the access terminal is in the active hold state. For example, when the access terminal in the active hold state sends a reverse link packet, the acknowledgement of the packet by the radio network on the ACK channel also serves to take the access terminal from the active hold state to the traffic state.

Let us now turn to the operation in the active hold state, e.g. the state 230. As has already been discussed, in some variants the access terminal (e.g., the terminal 130A) can be in this state while receiving forward link payload traffic. In these variants, the access terminal can power down the transmit chain elements for most of the time, turning the transmit chain back on when providing downlink feedback information. Because of the low duty cycle of the transmit chain being powered on while in the active hold state, as compared to the traffic state, significant power savings may be achieved. In some specific variants, the access terminal powers on its transmit chain to provide feedback (e.g., power control, data rate control, reverse link pilot, data source control) to the radio network once every 8 slots, corresponding to about 75 Hertz update rate; in other specific variants, the access terminal powers on its transmit chain once every 16 slots, corresponding to the update rate of about 37.5 Hertz. These update rates are two and four times slower, respectively, than the 150 Hertz update rate (once in every 4 slots in 1xEV-DO revision B) used in the traffic state. It should be noted that the invention is not limited to the particular update rates, or to the particular ratios between the active hold and traffic state update rates.

Providing feedback information at a slower rate may make communications between the access terminal and the radio network less robust, particularly in dynamic environments with fast changing physical propagation paths. For example, the physical propagation path between the access terminal and the base transceiver station may deteriorate (fade) faster than the radio network can compensate for by increasing the power control set point of the access terminal. To counteract this potential problem, in some variants the radio network increases the power control set point of the access terminal in the active hold state, relative to the power control set point in the traffic state with the same signal to noise and interference ratio (SINR). In some specific variants, the power control set point may be increased by approximately 1 dB, 2 dB, 3 dB, or 4 dB. The increase in the power control set point and the decrease in the update rate may depend on each other and be variable. For example, the power control set point may be increased by 2 dB (over the corresponding set point in traffic state given the same SINR) every time the update rate is halved (also relative to the corresponding rate in the traffic state). Furthermore, in some variants, the radio network increases the set point only up to a certain power limit. The power limit may be such that the increase of power beyond the limit would begin to affect power consumption of the access terminal. In many access terminals, the total power consumption is essentially the same (within 0.1 mW, for example) regardless of the actual transmit power, up until the transmit power reaches the power limit. Therefore, there is little penalty from the power consumption perspective in increasing the power control set point, as long as the transmit power does not exceed the aforementioned power limit. The power limit may be approximately 0 dBm, 5 dBm, or 10 dBm. These are of course exemplary values, and the actual power limit may differ.

Figure 3:
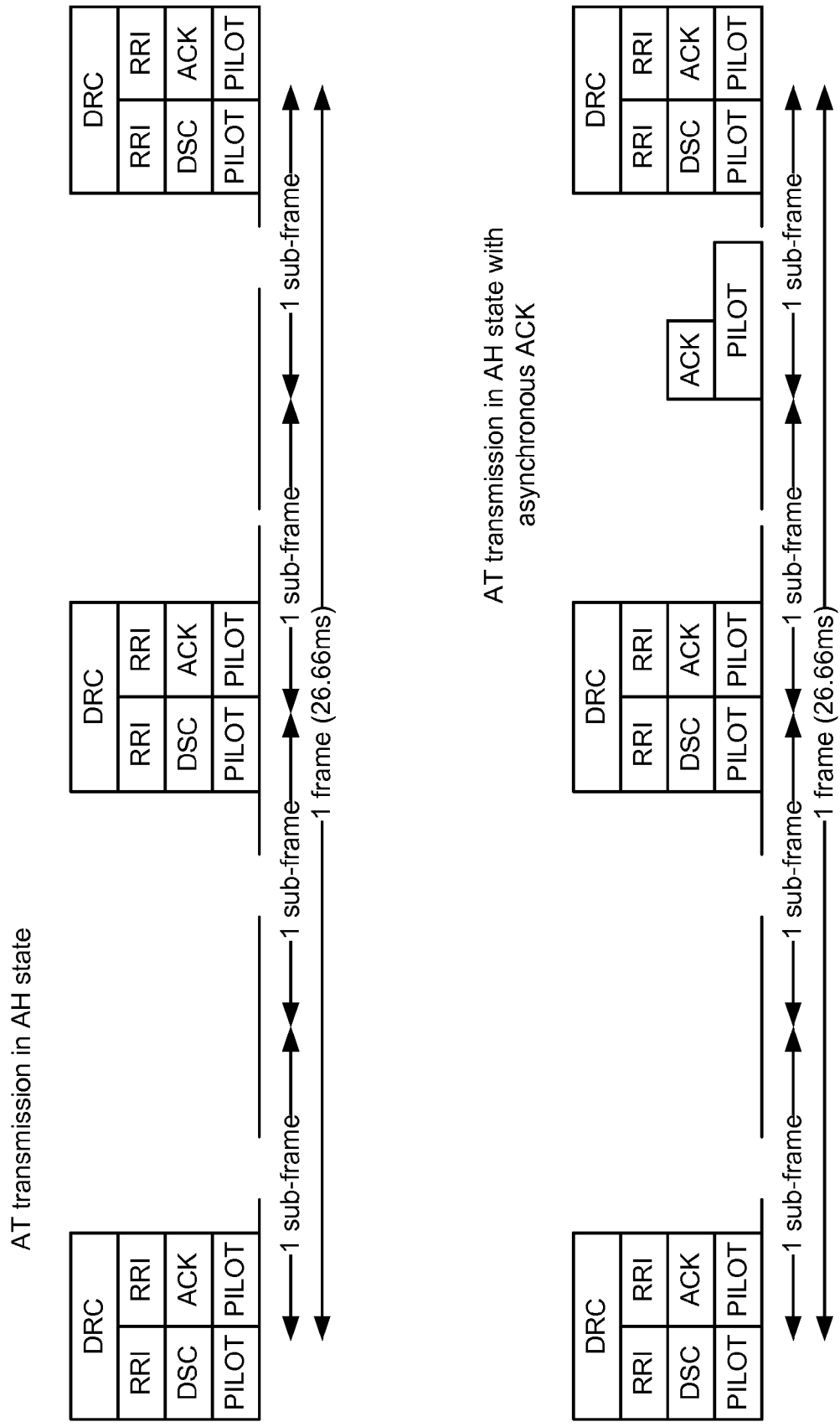
FIG. 3 is a simplified overview of operation of an access terminal in the active hold state, in accordance with an embodiment of the present invention.

FIG. 3 is a simplified overview of operation of certain variants in the active hold state.

Figure 4:
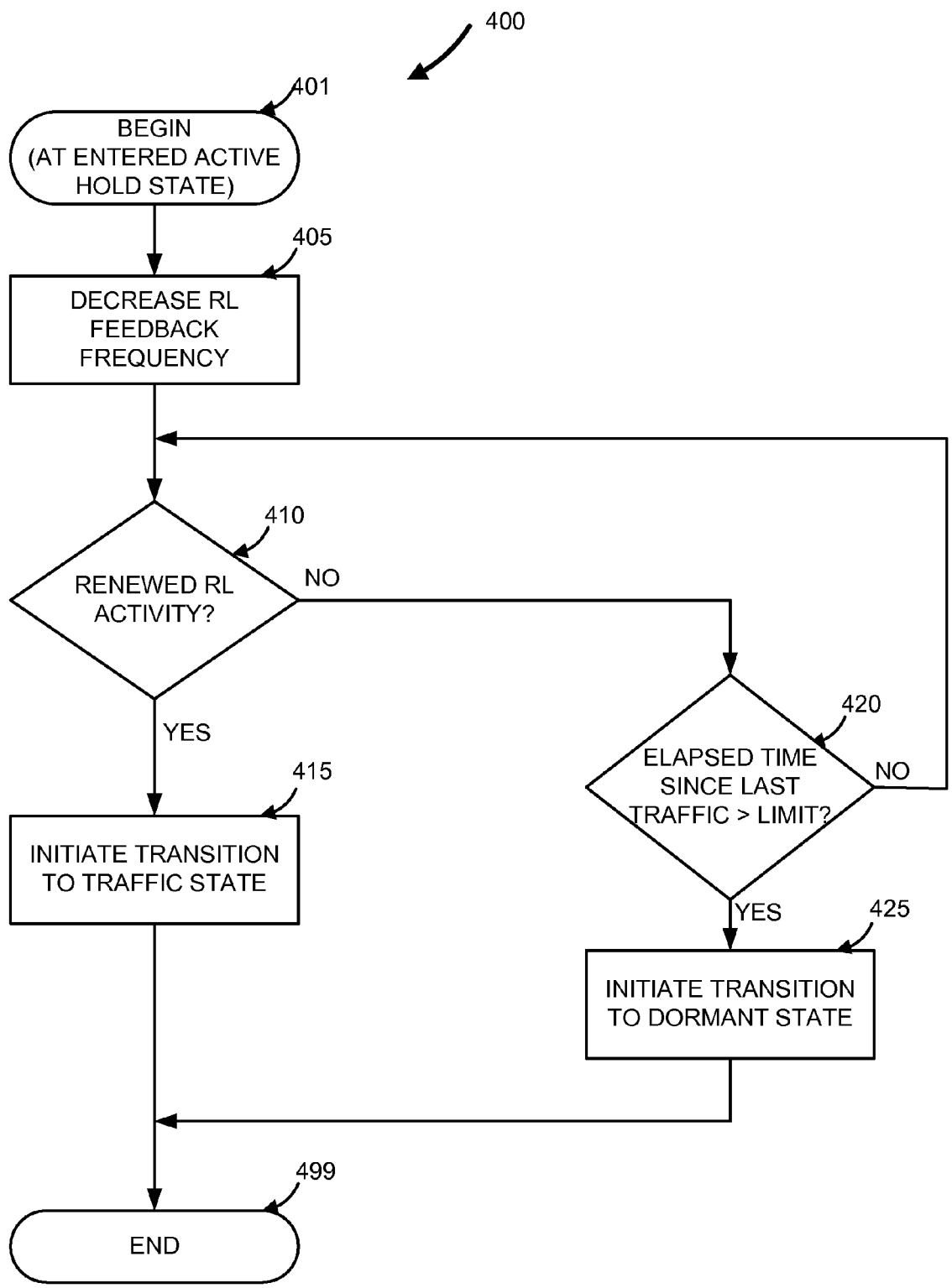
FIG. 4 illustrates selected steps and decision blocks of a process performed by an access terminal in the active hold state, in accordance with an embodiment of the present invention.

FIG. 4 illustrates an exemplary process 400 performed by an access terminal in the active hold state. At flow point 401, the access terminal has entered the active hold state due to some period of inactivity on the reverse link (during which period no payload data had been transmitted from the access terminal to the base transceiver station serving the access terminal). At step 405, the access terminal decreases the frequency of providing feedback updates to the base transceiver station. The base transceiver station may concurrently increase the power control set point of the access terminal.

At decision block 410, the access terminal determines if traffic (payload) activity has renewed on the reverse link. If there is renewed traffic activity on the reverse link, a transition to the traffic state is initiated at step 415, and the process 400 ends at flow point 499.

If there is no renewed traffic activity on the reverse link, process flow continues to decision block 420, in which the access terminal determines whether the elapsed time since last traffic is greater than some limit. The limit may be predetermined. If the elapsed time does not exceed the limit, as may be the case when the base transceiver station continues to transmit forward link traffic, process flow returns to decision block 410.

If the elapsed time exceeds the limit, a transition to the dormant state is initiated in step 425, and the process 400 ends at flow point 499.

Although steps and decisions of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. (It should be noted, however, that in selected variants the steps and decisions are performed in the order described above.) Furthermore, not every illustrated step and decision may be required in every embodiment in accordance with the invention, while some steps and decisions that have not been specifically illustrated may be desirable or necessary in some embodiments in accordance with the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

The invention claimed is:

1. A wireless access terminal for communicating with a base transceiver station of a radio network, the wireless access terminal comprising:
   a transmitter configured to send reverse link transmissions to the base transceiver station; and
   a controller coupled to the transmitter, wherein the controller is configured to execute program code to cause the wireless access terminal to:
      initiate transitions between a traffic state, a dormant state, and an active hold state, wherein the transitions between the traffic state and the active hold state are initiated by sending a codeword on a reverse rate indicator (RRI) channel, receive an indication of whether the radio network has granted the transitions on an acknowledgement (ACK) channel, and power off at least one component of the transmitter in the active hold state so that a duty cycle of said at least one component is less than a predetermined duty cycle threshold in the active hold state.

2. The wireless access terminal of claim 1, wherein the controller is further configured to execute the program code to cause the wireless access terminal to power on said at least one component of the transmitter for at least a majority of time in the traffic state.

3. The wireless access terminal of claim 2, wherein the controller is further configured to execute the program code to cause the wireless access terminal to provide feedback to the base transceiver station with a first frequency in the active hold state, and to provide feedback to the base transceiver station with a second frequency in the traffic state, the second frequency being greater than the first frequency.

4. The wireless access terminal of claim 3, wherein the second frequency is twice the first frequency.

5. The wireless access terminal of claim 3, wherein the second frequency is four times the first frequency.

6. The wireless access terminal of claim 3, wherein the feedback comprises reverse link pilot and forward link rate control.

7. The wireless access terminal of claim 2, wherein the controller is further configured to execute the program code to cause the wireless access terminal to provide feedback to the base transceiver station once in eight slots in the active hold state, and to provide feedback to the base transceiver station once in four slots in the traffic state.

8. The wireless access terminal of claim 2, wherein the controller is further configured to execute the program code to cause the wireless access terminal to provide feedback to the base transceiver station once in sixteen slots in the active hold state, and to provide feedback to the base transceiver station once in four slots in the traffic state.

9. The wireless access terminal of claim 1, wherein the controller is further configured to execute the program code to cause the wireless access terminal to transition from the dormant state to the active hold state in response to simultaneous presence of forward link traffic and absence of reverse link traffic.

10. The wireless access terminal of claim 1, further comprising:
a receiver configured to receive forward link transmissions from the base transceiver station,
wherein the controller configured to execute program code to cause the wireless access terminal to initiate transitions between a traffic state, a dormant state, and an active hold state is configured to:
initiate a transition from the traffic state to the active hold state in response to absence of reverse link traffic during a first predetermined time period,
initiate a transition from the active hold state to the traffic state in response to presence of reverse link traffic,
initiate a transition from the active hold state to the dormant state in response to absence of forward link traffic and reverse link traffic during a second predetermined period,
initiate a transition from the dormant state to the traffic state in response to presence of reverse link traffic, and
remain in the active hold state after transitioning into the active hold state during simultaneous presence of forward link traffic and absence of reverse link traffic.

11. The wireless access terminal of claim 1, wherein the predetermined duty cycle threshold is less than fifty percent.

12. The method of claim 1, wherein the codeword on the RRI channel comprises a spare codeword on the RRI channel, wherein the spare codeword is otherwise unused at the radio network.

13. A non-transitory machine-readable medium comprising instructions that, when executed by at least one processor of a wireless access terminal for communicating with a base transceiver station of a radio network, cause the wireless access terminal to perform operations comprising:
initiating transitions between a traffic state, a dormant state, and an active hold state, wherein the transitions between the traffic state and the active hold state are initiated by sending a codeword on the reverse rate indicator (RRI) channel;
receiving an indication of whether the radio network has granted the transitions on an acknowledgement (ACK) channel; and
in the active hold state, powering off at least one component of a transmitter of the access terminal so that a duty cycle of said at least one component is less than a predetermined duty cycle threshold in the active hold state.

14. The machine-readable medium of claim 13, wherein the instructions, when executed by said at least one processor, further cause the wireless access terminal to perform operations comprising:
powering on said at least one component of the transmitter for at least a majority of time in the traffic state.

15. The machine-readable medium of claim 14, wherein the instructions, when executed by said at least one processor, further cause the wireless access terminal to perform operations comprising:
providing feedback to the base transceiver station in the active hold state, the step of providing feedback in the active hold state being performed with a first frequency; and
providing feedback to the base transceiver station in the traffic state, the step of providing feedback in the traffic state being performed with a second frequency, the second frequency being greater than the first frequency.

16. The machine-readable medium of claim 15, wherein the feedback comprises reverse link pilot and rate control.

17. The machine-readable medium of claim 13, wherein the instructions, when executed by said at least one processor, further cause the wireless access terminal to perform operations comprising:
transitioning from the dormant state to the active hold state in response to simultaneous presence of forward link traffic and absence of reverse link traffic.

18. The machine-readable medium of claim 13, wherein initiating transitions between a traffic state, a dormant state, and an active hold state, comprises:
initiating a transition from the traffic state to the active hold state in response to absence of reverse link traffic during a first predetermined time period,
initiating a transition from the active hold state to the traffic state in response to presence of reverse link traffic,
initiating a transition from the active hold state to the dormant state in response to absence of forward link traffic and reverse link traffic during at least a second predetermined period,
initiating a transition from the dormant state to the traffic state in response to presence of reverse link traffic, and
after transitioning into the active hold state, remaining in the active hold state during simultaneous presence of forward link traffic and absence of reverse link traffic.

19. The machine-readable medium of claim 13, wherein the predetermined duty cycle threshold is less than fifty percent.

20. The machine-readable medium of claim 13, wherein the codeword on the RRI channel comprises a spare codeword on the RRI channel, wherein the spare codeword is otherwise unused at the radio network.

21. A wireless access terminal for communicating with a base transceiver station of a radio network, the wireless access terminal comprising:
 a means for sending reverse link transmissions to the base transceiver station; and
 a controller means for executing the program code to cause the wireless access terminal to perform steps comprising:
  initiating transitions between a traffic state, a dormant state, and an active hold state, wherein the transitions between the traffic state and the active hold state are initiated by sending a codeword on the reverse rate indicator (RRI) channel,
  receiving an indication of whether the radio network has granted the transitions on an acknowledgement (ACK) channel, and
  powering off at least one component of the transmitter so that a duty cycle of said at least one component is less than a predetermined duty cycle threshold in the active hold state.

22. The wireless access terminal of claim 21, further comprising:
 a means for receiving forward link transmissions from the base transceiver station,
 wherein initiating transitions between a traffic state, a dormant state, and an active hold state comprises:
 initiating a transition from the traffic state to the active hold state in response to absence of reverse link traffic during a first predetermined time period,
 initiating a transition from the active hold state to the traffic state in response to presence of reverse link traffic,
 initiating a transition from the active hold state to the dormant state in response to absence of forward link traffic and reverse link traffic during at least a second predetermined period,
 initiating a transition from the dormant state to the traffic state in response to presence of reverse link traffic, and
 after transitioning into the active hold state, remaining in the active hold state during simultaneous presence of forward link traffic and absence of reverse link traffic.

23. The wireless access terminal of claim 21, wherein the predetermined duty cycle threshold is less than fifty percent.

24. The wireless access terminal of claim 21, wherein the controller means is further configured to execute the program code to cause the wireless access terminal to power on said at least one component of the transmitter for at least a majority of time in the traffic state.

25. The wireless access terminal of claim 24, wherein the controller means is further configured to execute the program code to cause the wireless access terminal to provide feedback to the base transceiver station with a first frequency in the active hold state, and to provide feedback to the base transceiver station with a second frequency in the traffic state, the second frequency being greater than the first frequency.

26. The wireless access terminal of claim 25, wherein the second frequency is twice the first frequency.

27. The wireless access terminal of claim 25, wherein the second frequency is four times the first frequency.

28. The wireless access terminal of claim 25, wherein the feedback comprises reverse link pilot and forward link rate control.

29. The wireless access terminal of claim 24, wherein the controller means is further configured to execute the program code to cause the wireless access terminal to provide feedback to the base transceiver station once in eight slots in the active hold state, and to provide feedback to the base transceiver station once in four slots in the traffic state.

30. The wireless access terminal of claim 24, wherein the controller means is further configured to execute the program code to cause the wireless access terminal to provide feedback to the base transceiver station once in sixteen slots in the active hold state, and to provide feedback to the base transceiver station once in four slots in the traffic state.

31. The wireless access terminal of claim 21, wherein the controller means is further configured to execute the program code to cause the wireless access terminal to transition from the dormant state to the active hold state in response to simultaneous presence of forward link traffic and absence of reverse link traffic.

32. The wireless access terminal of claim 21, wherein the codeword on the RRI channel comprises a spare codeword on the RRI channel, wherein the spare codeword is otherwise unused at the radio network.

33. A method of operating a wireless access terminal for communicating with a base transceiver station of a radio network, the method comprising:
 initiating transitions between a traffic state, a dormant state, and an active hold state, wherein the transitions between the traffic state and the active hold state are initiated by sending a codeword on the reverse rate indicator (RRI) channel and receiving an indication of whether the radio network has granted the transitions on an acknowledgement (ACK) channel; and
 in the active hold state, powering off at least one component of a transmitter of the wireless access terminal so that a duty cycle of said at least one component is less than a predetermined duty cycle threshold in the active hold state.

34. The method of claim 33, wherein the predetermined duty cycle threshold is twenty-five percent.

35. The method of claim 34, further comprising:
 causing the wireless access terminal to power on said at least one component of the transmitter for at least a majority of time in the traffic state.

36. The method of claim 35, further comprising:
 providing feedback from the wireless access terminal to the base transceiver station in the active hold state, the step of providing feedback in the active hold state being performed with a first frequency; and
 providing the feedback from the wireless access terminal to the base transceiver station in the traffic state, the step of providing feedback in the traffic state being performed with a second frequency, the second frequency being greater than the first frequency.

37. The method of claim 36, wherein the second frequency is at least twice the first frequency.

38. The method of claim 36, wherein the second frequency is at least four times the first frequency.

39. The method of claim 36, wherein the second frequency is about 150 Hertz, and the first frequency is about 75 Hertz.

40. The method of claim 36, wherein the second frequency is about 150 Hertz, and the first frequency is about 37.5 Hertz.

41. The method of claim 36, wherein the feedback comprises reverse link pilot and rate control.

42. The method of claim 36, wherein the feedback comprises data rate control (DRC).

43. The method of claim 36, wherein the feedback comprises data source control (DSC).

44. The method of claim 35, further comprising:
providing feedback from the wireless access terminal to the base transceiver station once in eight slots in the active hold state; and
providing feedback from the wireless access terminal to the base transceiver station once in four slots in the traffic state.

45. The method of claim 35, further comprising:
providing feedback from the wireless access terminal to the base transceiver station once in sixteen slots in the active hold state; and
providing feedback from the wireless access terminal to the base transceiver station once in four slots in the traffic state.

46. The method of claim 33, further comprising:
causing the wireless access terminal to transition from the dormant state to the active hold state in response to simultaneous presence of forward link traffic and absence of reverse link traffic.

47. The method of claim 33, further comprising:
receiving from the base transceiver station an acknowledgement of the codeword on the RRI channel; and
transitioning the wireless access terminal to the active hold state in response to the acknowledgement.

48. The method of claim 33, wherein initiating transitions between a traffic state, a dormant state, and an active hold state comprises:
initiating a transition from the traffic state to the active hold state in response to absence of reverse link traffic during a first predetermined time period,
initiating a transition from the active hold state to the traffic state in response to presence of reverse link traffic,
initiating a transition from the active hold state to the dormant state in response to absence of forward link traffic and reverse link traffic during at least a second predetermined period,
initiating a transition from the dormant state to the traffic state in response to presence of reverse link traffic, and
after transitioning into the active hold state, remaining in the active hold state during simultaneous presence of forward link traffic and absence of reverse link traffic.

49. The method of claim 33, wherein the predetermined duty cycle threshold is less than fifty percent.

50. The method of claim 33, wherein the codeword on the RRI channel comprises a spare codeword on the RRI channel, wherein the spare codeword is otherwise unused at the radio network.

* * * * *